(12) United States Patent
Geiger et al.

(10) Patent No.: US 6,586,852 B2
(45) Date of Patent: Jul. 1, 2003

(54) DRIVE SYSTEM

(75) Inventors: Martin Geiger, Güntersleben (DE); Bernhard Schierling, Kürnach (DE)

(73) Assignee: Mannesmann Sachs AG, Schweinfurt (DE)

( * ) Notice: Subject to any disclaimer, the term of this patent is extended or adjusted under 35 U.S.C. 154(b) by 45 days.

(21) Appl. No.: 09/783,442

(22) Filed: Feb. 14, 2001

(65) Prior Publication Data

US 2001/0023785 A1 Sep. 27, 2001

(30) Foreign Application Priority Data

Feb. 15, 2000 (DE) .......................... 100 06 646
May 11, 2000 (DE) .......................... 100 23 113

(51) Int. Cl.[7] ................................ H02K 5/24
(52) U.S. Cl. .................. 310/51; 310/92; 310/75 R
(58) Field of Search ................... 310/51, 68 B, 310/78, 76, 80, 92, 96, 97, 98, 100; 74/574, 573 R; 324/207.25

(56) References Cited

U.S. PATENT DOCUMENTS 5,691,588 A * 11/1997 Lutz et al. ................... 310/92
6,215,213 B1 4/2001 Förster et al. ............... 310/78

FOREIGN PATENT DOCUMENTS

DE 199 14 376 A1 10/1999

* cited by examiner

*Primary Examiner*—Thanh Lam
(74) *Attorney, Agent, or Firm*—Cohen, Pontani, Lieberman & Pavane

(57) ABSTRACT

A drive system, in particular for a vehicle, includes an electric machine, by means of which a shaft can be driven to rotate and/or electrical energy can be obtained when the shaft rotates. The electric machine includes a stator arrangement with a stator interaction region and a rotor arrangement with a rotor interaction region. The rotor interaction region is coupled or can be coupled to the shaft for common rotation by means of a carrier arrangement. A torsional-vibration damper arrangement includes which is formed at least in part by said carrier arrangement, a primary side and a secondary side which can rotate, counter to the action of a damper element arrangement, about an axis of rotation (A) with respect to the primary side.

36 Claims, 7 Drawing Sheets

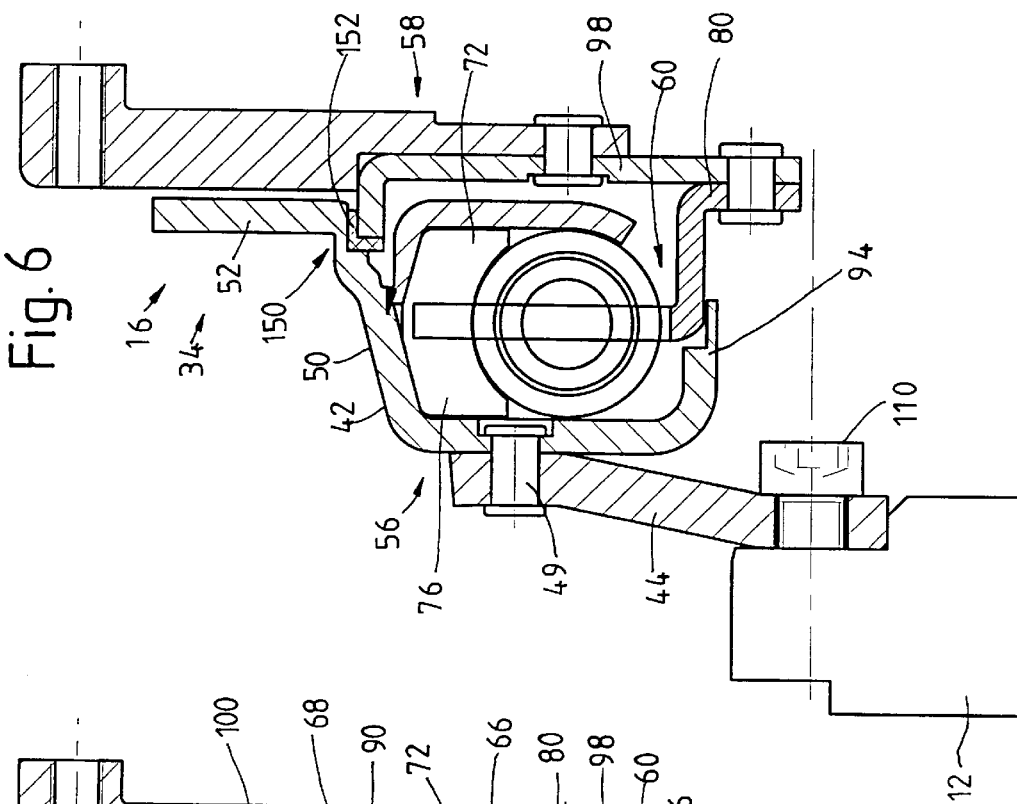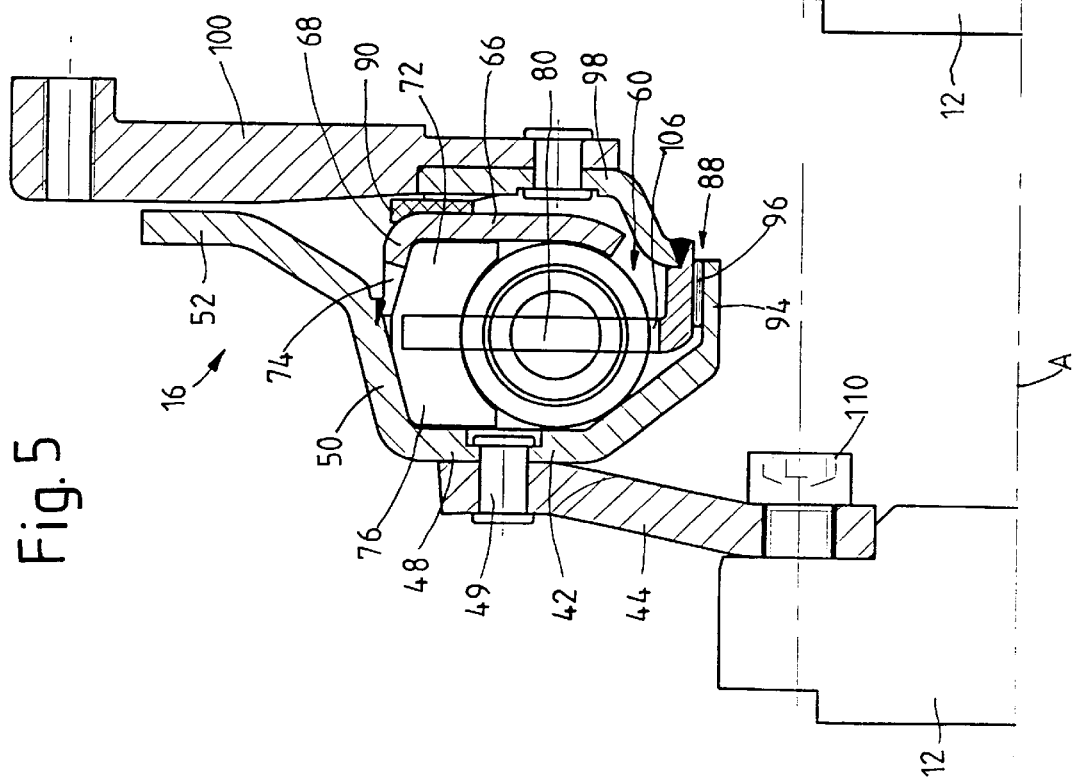

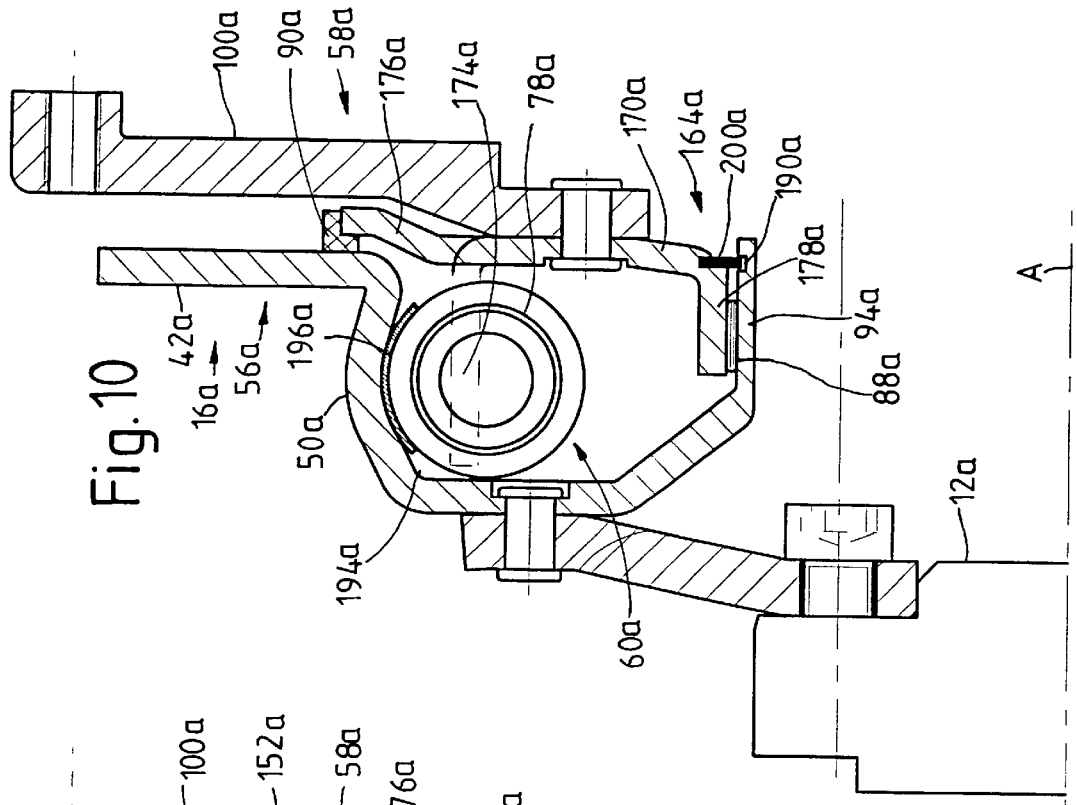
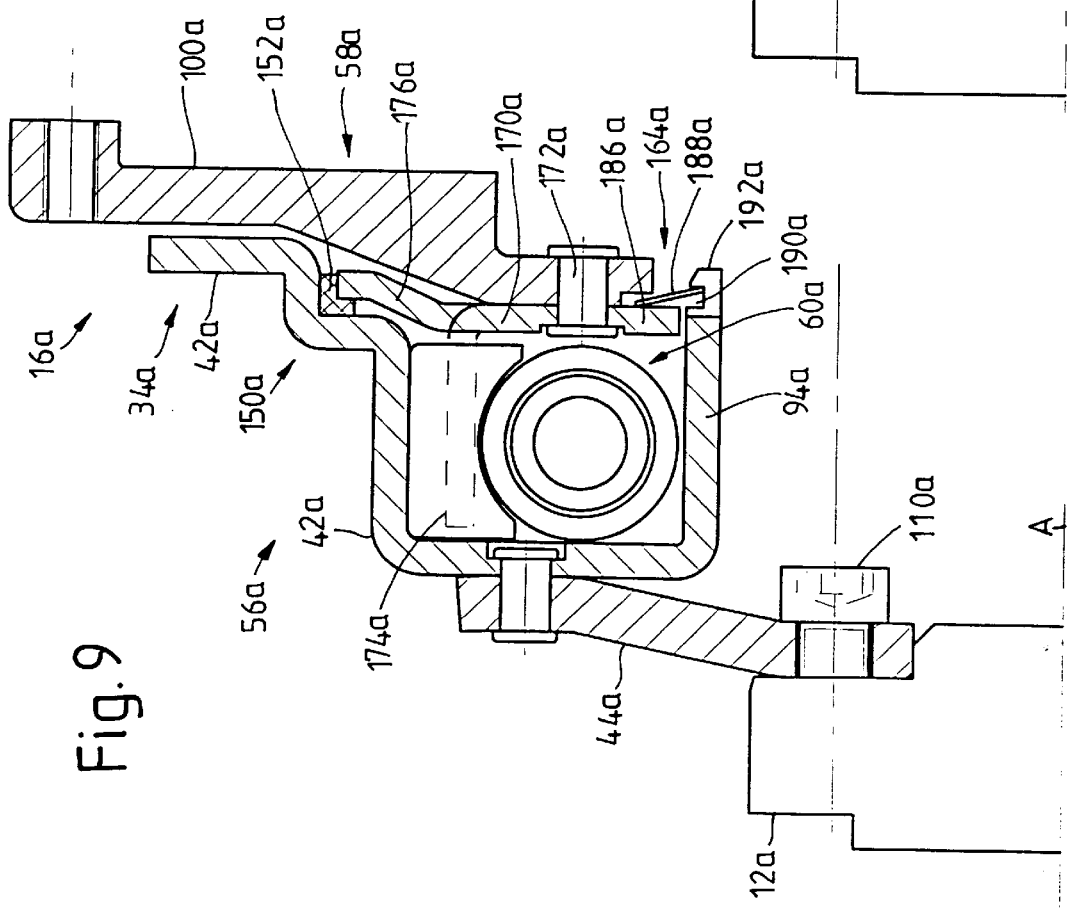

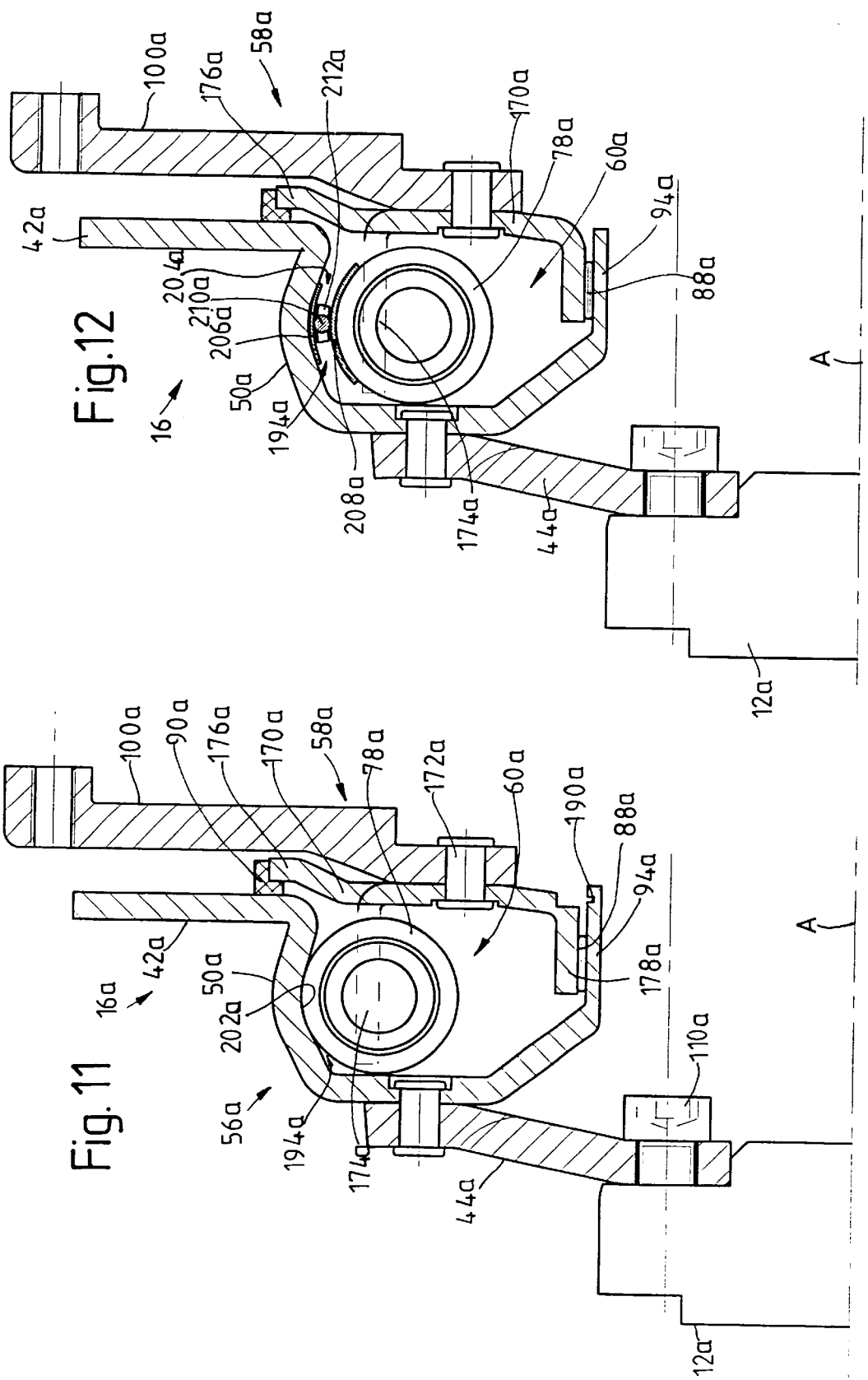

DRIVE SYSTEM

BACKGROUND OF THE INVENTION

1. Field of the Invention

The present invention relates to a drive system, in particular for a vehicle, including an electric machine, by means of which a shaft can be driven to rotate and/or electrical energy can be obtained when the shaft rotates. The electric machine has a stator arrangement with a stator interaction region and a rotor arrangement with a rotor interaction region, the rotor interaction region being coupled or capable of being coupled to the shaft for common rotation by means of a carrier arrangement. The drive system further includes a torsional-vibration damper arrangement with a primary side and a secondary side which can rotate, counter to the action of a damper element arrangement, about an axis of rotation with respect to the primary side.

2. Description of the Related Art

A drive system of this type is known, for example, from DE 199 14 376 A1. In this drive system, the torsional-vibration damper arrangement is designed so that it is either bolted onto a drive shaft together with the carrier arrangement for the rotor interaction region, or so that one of the primary side and the secondary side is linked to the carrier arrangement for common rotation or, via this arrangement, is connected in a rotationally fixed manner to the drive shaft. The result is a structure which takes up a relatively large amount of space, but this causes difficulties in particular when drive systems of this type are integrated in a drive train of small motor vehicles.

SUMMARY OF THE INVENTION

The object of the present invention is to refine a drive system of the generic type in such a manner that the space which it takes up can be reduced.

According to the invention, this object is achieved by a drive system, in particular for a vehicle, comprising an electric machine, by means of which a shaft can be driven to rotate and/or electrical energy can be obtained when the shaft rotates. The electric machine includes a stator arrangement with a stator interaction region and a rotor arrangement with a rotor interaction region, the rotor interaction region being coupled or capable of being coupled to the shaft for common rotation by means of a carrier arrangement. The drive system further includes a torsional-vibration damper arrangement with a primary side and a secondary side which can rotate, counter to the action of a damper element arrangement, about an axis of rotation with respect to the primary side.

In this system, it is furthermore provided that the carrier arrangement forms at least a part of the primary side.

The integration of functions, i.e. the incorporation of the carrier arrangement or a section thereof into the torsional-vibration damper arrangement, makes it possible to save on the number of components, and the electric machine and torsional-vibration damper arrangement assemblies can be positioned closer together, with the advantage that the overall size or length of a system of this type can be reduced compared to systems which are known from the prior art.

To further minimize the space which has to be made available, the carrier arrangement has its region which forms at least a part of the primary side located substantially radially inside the stator arrangement and preferably axially overlaps this arrangement at least in regions.

By way of example, the carrier arrangement may form a part of the primary side which serves to support the forces of the damper element arrangement.

To ensure symmetrical transmission of forces without the risk of primary side and secondary side becoming misaligned with respect to one another, the primary side has two force-supporting regions which, at least in regions, lie at an axial distance from one another, and the carrier arrangement forms one of the force-supporting regions. This can be achieved in a manner which is simple to produce by the fact that the primary side has two cover disk regions which form the force-supporting regions, and that the carrier arrangement forms one of the cover disk regions. In this case, it is furthermore advantageously provided that the secondary side has a central disk element which engages axially between the two force-supporting regions of the primary side.

In an alternative embodiment, the carrier arrangement, in a region which extends substantially axially and radially outside the damper element arrangement, has at least one first force-supporting region for the damper element arrangement. The secondary side has a second force-supporting region, which extends substantially axially, associated with at least one first force-supporting region of the primary side. In an embodiment of this type, the at least one first force-supporting region and the associated second force-supporting region preferably lie between the end regions of two damper elements which follow one another in the circumferential direction.

In design terms, this embodiment can be made particularly simple by the carrier arrangement having a carrier element which forms the part of the primary side, that the secondary side having a driver element which has the at least one second force-supporting region, and the carrier element and the driver element together forming a rotation-angle limitation for the torsional-vibration damper arrangement. In addition to its function of being able to transmit torque in damping mode, a further integration of function is provided in this case, namely that of preventing excessive compression of the damper element arrangement as a result of the rotation-angle limitation arrangement becoming active.

To achieve further integration of functions into assemblies or components which are already present, the secondary side can be supported in the radial direction and/or in the axial direction on the carrier arrangement. In this case, the central disk element is preferably supported on the carrier arrangement, preferably via a radial bearing arrangement.

With regard to the support of the primary side with respect to the secondary side, a bearing region for axially and radially supporting the secondary side with respect to the primary side may be formed on the carrier arrangement.

To connect the two cover disk regions in a simple manner and without the insertion of additional components, one of the cover disks has a connecting section for connection, preferably by welding, to the other cover disk region. This extends axially toward the other cover disk region and preferably radially outward.

If the connecting section lies substantially radially inside the stator arrangement and axially overlaps the stator arrangement, this part of the carrier arrangement can simultaneously serve to axially bridge the stator arrangement. The torsional-vibration damper arrangement can therefore be positioned even closer to the electric machine or is arranged substantially radially inside the stator arrangement thereof or axially overlaps this arrangement.

To produce a simple connection between the two cover disk regions, the other cover disk region, by means of a connecting section thereof, preferably extends axially toward the carrier arrangement and preferably radially outward.

To obtain a stable axial support between primary side and secondary side, the secondary side can be axially supported on the carrier arrangement via the second cover disk region. In this case, the secondary side is preferably axially supported on the secondary cover disk region in or close to a transition between a section which extends substantially radially and a connecting section which extends axially and preferably radially outward toward the carrier arrangement. The axial support in this connecting region produces an axially highly stable, i.e. relatively unyielding support, since in particular even when produced from sheet-metal material, the second cover disk region is very deformation-resistant in this transition region.

For axial support, the secondary side can be supported on a second cover disk element, with an axial bearing arrangement, preferably a slide bearing arrangement, arranged between them.

In the drive system according to the invention, in particular its torsional-vibration damper arrangement, the two cover disk regions preferably form a space between them which contains the damper element arrangement. This space is at the maximum radial distance from the axis of rotation, preferably in the region of the connection between the two cover disk regions.

The force-transmitting support of the damper elements, for example damper springs, on the primary side or the secondary side often takes place with so-called spring plates or spring saddles arranged in between, allowing better distribution of pressure or load. These spring plates are then generally supported radially on the outside on a slideway which is formed in the region of one or both of the cover disk regions.

In open systems, i.e. those which do not use lubricant in this region, there is a fundamental risk of considerable and undefined friction being introduced by abraded particles which are generated in operation and accumulate between the spring plates and the slideway, and this friction may also entail considerable abrasion in the region of the spring plates. To counteract this problem, at least one particle-removal opening is provided in at least one of the cover disk regions, preferably a connecting section thereof. This particle-removal opening passes through this region or section and opens out into the space in or close to the region which is at the greatest radial distance from the axis of rotation. Providing a particle-removal opening of this nature ensures that the abraded particles which collect radially on the outside due to centrifugal force can be conveyed out of the region in which the spring plates or the spring saddles are to slide along the associated slideway.

To provide a stable support combined with a simple structure, the secondary side is axially and/or radially supported on the carrier arrangement, radially outside the connection of the second cover disk region to the carrier arrangement.

In the drive system according to the invention, the carrier arrangement preferably has a first carrier element, which forms at least a part of the torsional-vibration damper arrangement and carries the rotor interaction region, and a second carrier element, which couples the first carrier element to the shaft. Naturally, it is also possible for the first carrier element to be directly linked to the shaft.

In rotary operation, tumbling movements frequently occur, being introduced by nonuniform rotary movements in the region of the shaft, for example a crankshaft. To damp these tumbling movements in the torque-transmission path and thus also ensure that the air gap between the rotor interaction region and the stator interaction region remains approximately constant in rotary operation, the second carrier element contacts the first carrier element by means of a contact region which is convex with respect to the first carrier element and extends around the axis of rotation. The curved contour allows a minimum rolling movement of the second carrier element on the first carrier element, so that the second carrier element together with the shaft can be at least slightly inclined with respect to the axis of rotation, without this incline inevitably also being transmitted to the first carrier element.

To facilitate integrating a system according to the invention in a drive train, the secondary side is supported in the radial direction on a radially inner region of the primary side, preferably of the first carrier element, and the second carrier element is or can be coupled to the shaft radially inside the radial support of the secondary side with respect to the primary side. In this way, threaded bolts which are used for this coupling can easily be introduced in the axial direction, without any components being impeded, and can be screwed into associated threaded openings in the shaft.

In another embodiment which is preferred on account of its very simple design, the carrier arrangement has a carrier element which, in its radially outer region, carries the rotor interaction region, in its radially inner region is or can be coupled to the shaft and between its radially outer region and its radially inner region forms the part of the primary side.

To ensure that the electric machine does not overheat when operating, particularly in the region of the stator arrangement, the carrier arrangement, in the radial region of the stator arrangement, has at least one air-passage opening region and/or at least one fan blade region.

If, in the system according to the invention, contaminating particles are produced or collect therein, there is a fundamental risk of these particles passing into the air gap between the rotor interaction region and the stator interaction region. This could impair the performance of the electric machine. To counteract this, the carrier arrangement has a hollow-like particle-receiving region which is open toward the radially inner side, surrounds the axis of rotation and into which preferably at least one particle-removal opening opens. Particles can then be trapped in the particle-receiving region of the carrier arrangement, which preferably lies close to the region of the air gap or slightly radially inside it, and can be removed from this region, for example through a particle-removal opening, without there being any risk of a further movement toward the air gap.

In rotary operation, the damper elements of the damper element arrangement are forced radially outward by the centrifugal forces which are active, so that they are supported radially on the outside, for example on the primary side, with frictional forces being generated.

To reduce these frictional forces, which may lead to an undesirable effect on the damping performance, at least some of the damper elements of the damper element arrangement are radially and/or axially supported on the primary side, with a bearing arrangement in between. For this purpose, the bearing arrangement may include at least one sliding bearing element which is carried on the primary side. A coating of sliding bearing material may also be provided on the primary side. Furthermore, a very low-friction bearing can be obtained if the bearing arrangement comprises a rolling bearing arrangement which is supported with respect to the primary side and the damper element arrangement.

To be able to ensure that the system according to the invention is held together in a defined way even when it has not yet been integrated in a drive shaft or the like, it is possible to provide an axial securing arrangement which acts between the primary side and the secondary side.

As has already been mentioned, in order for particles to be removed from the region of the damper element arrangement, the damper element arrangement may be arranged in a space which is substantially surrounded by two cover disk regions, and at least one particle-removal opening, which preferably opens out into a radially outer region of the space, may be provided in at least one of the cover disk regions.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

FIGS. 5–12 show modifications of the drive system according to the invention in the region of the torsional-vibration damper arrangement.

DETAILED DESCRIPTION OF THE PRESENTLY PREFERRED EMBODIMENTS

Figure 1:
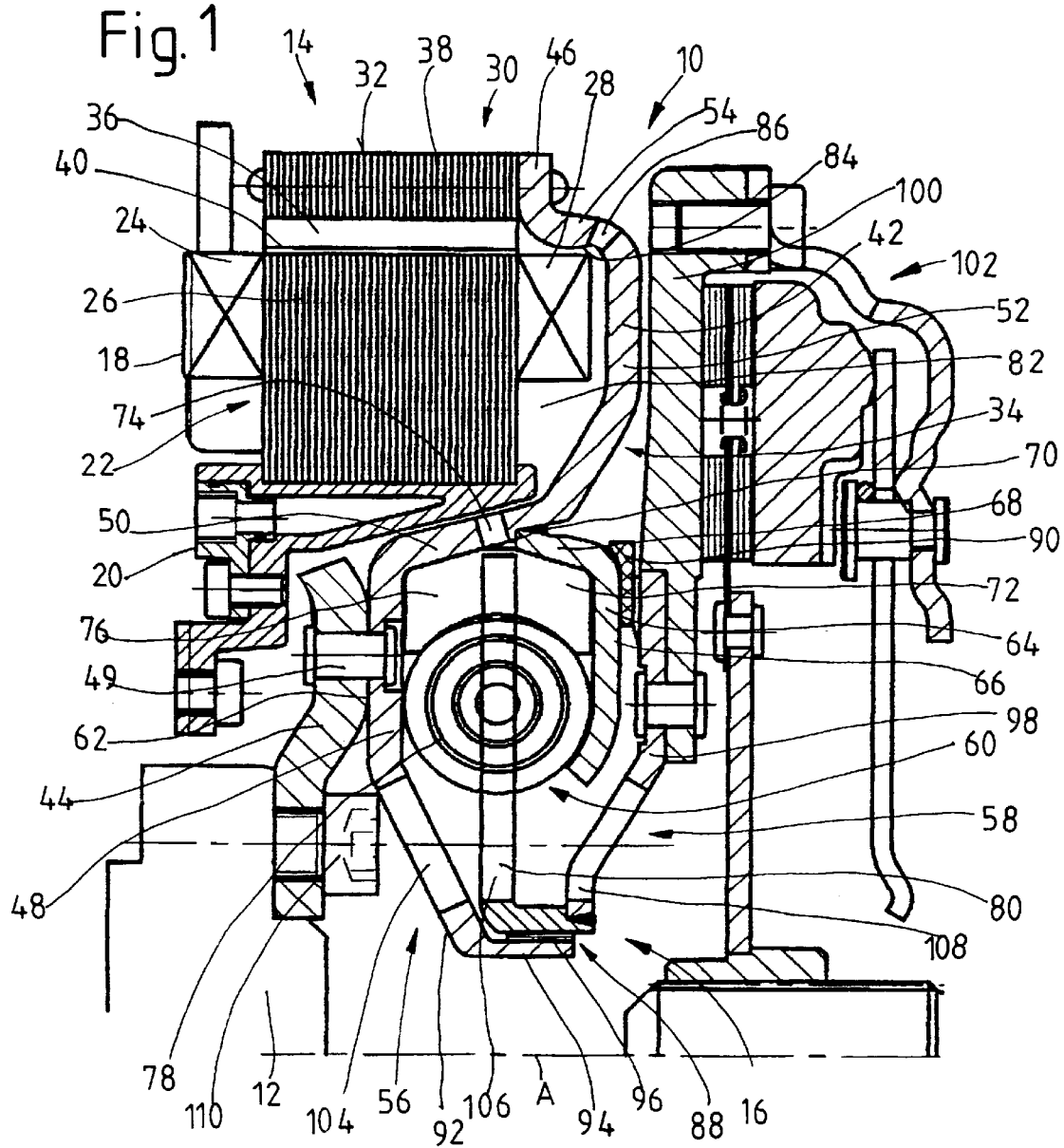
FIG. 1 shows a partial longitudinal sectional view of a drive system according to the invention.

In FIG. 1, a drive system 10 according to the invention may be incorporated in a drive train, i.e. form a part thereof, which is able to transmit a driving force between a drive unit and driven wheels. In the figure, a crankshaft 12 of a drive unit of this type is diagrammatically illustrated as a drive shaft.

The drive system 10 includes an electric machine 14 and a torsional-vibration damper arrangement 16. The electric machine 14 has a stator arrangement 18 which, by way of example, may be carried on a stator carrier 20 on an engine block or the like (not shown). The stator arrangement 18 comprises a stator interaction region 22 with a plurality of stator windings 24 and bundles of laminations 26 which form a yoke. The end windings 28 of the windings 24 project laterally beyond the bundles of laminations 26. The electric machine 24 also comprises a rotor arrangement 30 with a rotor interaction region 32 and a carrier arrangement 34, which is described in more detail below. The rotor interaction region 32 comprises a plurality of permanent magnets 36 which are carried on its inner side and bundles of laminations 38 which form a yoke of the rotor interaction region 32. Between the permanent magnets 36 and the stator interaction region 22 an air gap 40 is formed, which should be as small as possible in order to optimize the efficiency of the electric machine 14.

The carrier arrangement 34 comprises two carrier elements 42, 44. The first carrier element 42 carries the rotor interaction region 32 radially on the outside by means of an outer section 46 which extends substantially radially. An inner section 48 which lies radially further inward and likewise extends substantially radially, is connected to the second carrier element 44 by a plurality of bolt rivets 49 or the like which follow one another in the circumferential direction. The second carrier element 44, in its section which bears against the inner section 48 of the first carrier element 42, is designed with a contour which is convex or curved all the way around in the circumferential direction and with respect to the inner section 48. If tumbling movements occur during rotation of the crankshaft 12, there is no sharp-edged contact between the first carrier element 42 and the second carrier element 44. Rather, despite the presence of the bolt rivets 49, the second carrier element 44 rolls slightly along the innersection 48 of the first carrier element 42 and thus provides at least partial compensation for or reduction of the tumbling movement.

Radially on the outside, adjoining the inner section 48 which extends substantially radially, the first carrier element 42 has a connecting section 50 which extends in the direction of the axis of rotation A and slightly radially outward and which overlaps or axially bridges the stator interaction region 22 in the direction of the axis. Adjacent to this connecting section 50, the first carrier element 42 has a section 52 which extends substantially radially outward again. Between this section 52, which also bridges the end windings 28 in the radially outward direction, and the outer section 46, there lies a section 54 which extends approximately axially and once again at least partially bridges the end windings 28 in the direction of the axis.

The torsional-vibration damper arrangement 16 includes a primary side 56 which is or can be firmly connected to the crankshaft 12 for common rotation, and furthermore includes a secondary side 58 which can be rotated, counter to the damping action of a damper element arrangement 60, about the axis of rotation A within a limited rotational-angle range with respect to the primary side 56. In order for the drive system 10 to take up as little space as possible, the carrier arrangement 34 is integrated, in terms of function and parts, in the torsional-vibration damper arrangement 16. For this purpose, the first carrier element 42, by means of its inner section 48 which extends substantially radially and by means of its first connecting section 50, forms a first cover disk region 62 of the primary side 56. A second cover disk region 64 of the primary side 56 is a substantially separate element, for example an element which has been punched out of sheet metal and formed. A section 66 extends substantially radially, and in the direction of the axis lies substantially opposite the inner section 48 of the first cover disk region 62. Radially on the outside, this section 66 is adjoined by a connecting section 68 of the second cover disk region 64, which substantially extends in the direction of the axis of rotation A and slightly radially outward toward the first carrier element 42. Therefore, ultimately the two connecting sections 50, 68 of the first and second cover disk regions 62, 64 bear against one another in their axial end regions. In this case, it is possible, for example in the first carrier element 42, to provide a hollow 70 which is formed by stamping and into which the connecting section 68 is fitted by means of its axial and free end and is thus held axially and radially with respect to the carrier element 42. These cover disk regions 62 and 64 can then be securely joined to one another in this region by welding. The two connecting sections 50, 68 thus form that region in which the sections 48, 66, which interact with the damper element arrangement 60 for torque-transmitting interaction and extend substantially radially, of the cover disk regions 62, 64 are fixedly connected to one another.

The two connecting sections 50, 68 together, when considered in longitudinal section, form an apex-like or roof-like configuration. The result is that a space 72, which is formed between the cover disk regions 62, 64 and substantially contains the damper element arrangement 60, is at the maximum radial distance from the axis of rotation A in or close to the region where the two connecting sections 50, 68 are connected. In this region of maximum radial distance, the space 62 is open to the radially outer side via a plurality of particle-removal openings 74, which are discussed in more detail below and are formed in the end region of the connecting section 50 of the first carrier element 42. On the surface facing toward the space 72, the two connecting sections 50, 68 each form slideways, along which so-called spring plates or sliding blocks 76 of the torsional-vibration damper arrangement 16 can move in the circumferential direction with support brought about by centrifugal forces. In a manner which is known per se, the damper elements, for example damper springs 78, of the damper element arrangement 60 are supported on the primary side 56, for example on axial or radial bulges formed on the sections 48, 66 and/or if appropriate on connecting sections 50, 68. The damper elements are supported on the secondary side 58, for example a central disk element 80 thereof, by supporting elements like spring plates 76 so that better pressure distribution is provided in the region of the support on the primary side 56 or the secondary side 58. It is also possible for the damper element arrangement 60, between the support on the primary side 56 and the secondary side 58, to have in each case a plurality of separate damper elements or damper springs 78 which follow one another in the circumferential direction and between which supporting elements of this type, i.e. sliding blocks, are likewise provided, which can move in the circumferential direction along the above-mentioned slideways.

If, in rotary operation, rotary oscillations occur, the primary side 56 rotates with respect to the secondary side 58, compressing the damper springs 78, so that it is possible to counteract vibration of this nature. During the resultant sliding movement of the sliding blocks along the slideways, abrasion may occur, and abraded particles which are produced in this way or other contaminating particles which enter the space region 72 can then be removed from the space region 72 through the particle-removal openings 74. These particles move radially outward by centrifugal forces, so that ultimately they move into a space 82 formed between the stator interaction region 22 and the section 52 of the carrier element 42. This space 82 also leads along the end windings 28. The particles which move radially outward then contact that section 54 of the first carrier element 42 which extends substantially axially and lies radially outside the end windings 28. A swaged hollow 84, which extends in the circumferential direction and has a plurality of radial particle-removal openings 86, is formed in this section 54. The particles which have been flung radially outward are trapped in this hollow 84, where they collect and move radially outward through openings 86. In this way, it is possible to prevent particles which are flung from the radially inner side toward the radially outer side from entering the air gap 40 between the rotor interaction region 22 and the stator interaction region 32 and causing operating faults in that area.

The primary side 56 and the secondary side 58 are mounted radially and axially with respect to one another by means of two bearing arrangements 88, 90. For this purpose, the carrier arrangement 34, for example the first carrier element 42 thereof, has a section 92 which extends radially inward beyond the section 48 thereof which serves to transmit torque and ends in a substantially cylindrical section 94. Radially outside this cylindrical section 94 is a cylindrical section 96 of the central disk element 80. The radial bearing arrangement 88, for example a sliding bearing sleeve, lies between these two cylindrical sections 94, 96.

The second bearing arrangement 90, which is in the form of a sliding bearing ring, is provided on that side of the second cover disk region 64 which is remote from the first carrier element 42, in particular in the transition region between the radially extending section 66 and the substantially axially extending connecting section 68. This bearing arrangement 90 therefore forms the axial bearing arrangement on which the secondary side 58, for example a coupling disk 98 thereof, can be axially supported or can bear in the axial direction. This coupling element 98 may be securely connected radially on the inside to the central disk element 80 by welding or the like and may carry a flywheel or a flywheel mass 100 of a friction clutch 102. As a result of the bearing arrangement 90, when axial forces are transmitted to this arrangement, deformation substantially will not occur in the region of the second cover disk region 64 nor in the region of the first cover disk region 62. In the region in which the axial forces are supported, substantially axially extending sections are provided and an inward springing movement is thus substantially prevented.

This type of axial and radial bearing makes it possible for passage openings 104, 106 and 108 to be provided in axial alignment in the first carrier element 42, in the central disk element 80 and in the coupling element 98, through which passage openings it is possible to access threaded bolts 110 by means of which fix the carrier arrangement 34 to the crankshaft 12 at the second carrier element 44. This means that when a drive system 10 of this type is being incorporated into a drive train, after the stator interaction region 22 has been fixed to a stationary assembly, for example the engine block, the assembly which comprises carrier arrangements 34, rotor interaction region 42 and the further components of the torsional-vibration damper arrangement 16 and to which the flywheel 100 may additionally also be fixed, is moved into place and then fixed by the threaded bolts 110. Then, the pressure plate assembly of the friction clutch 102 together with the clutch disk is moved into position and integrated into the system. In a structure of this type, there is interaction both in terms of functions and parts between the rotor arrangement 30, i.e. in particular its carrier arrangement 34, and the torsional-vibration damper arrangement 16. The rotor arrangement 30, with all its regions, ultimately forms a primary mass for the torsional-vibration damper arrangement 16. The flywheel 100 or the components which are fixedly connected thereto form a secondary mass of the torsional-vibration damper arrangement 16, which is therefore ultimately designed as a two-mass flywheel.

In order, with this very small design of a drive system 10, to ensure that the electric machine is not overheated, in particular in the region of its stator arrangement 18, it is possible, in a manner known per se, to provide a fluid cooling system, which is connected to the cooling system of the drive unit, for the stator arrangement 18. Furthermore, it is possible to provide a plurality of air passage openings, which follow one another in the circumferential direction and are preferably elongated from the radially inner side toward the radially outer side, in the substantially radially extending region 52 of the first carrier element. Those sections of material of the section 52 which lie between individual air passage openings can then, by deformation, be turned out of the plane of the section 52, for example up to an angle of 45°, so that ultimately they adopt a fan blade configuration. In rotary operation, this blade configuration makes it possible to ensure that either fresh air is conveyed from the outside to the stator interaction region 22 or, if inclined in the opposite direction, hot air is extracted from the region of the rotor interaction region 22. When the air-extracting configuration is provided, it is at the same time also possible to ensure that increased amounts of particles which have escaped from the particle-outlet openings 74 are extracted from the region of the electric machine 14.

The present invention provides a drive system, comprising an electric machine 14 and a torsional-vibration damper arrangement 16 which, on account of the integration of the parts of these two assemblies, takes up very little space. The carrier arrangement 34 of the rotor arrangement 30 forms a force-supporting region of the primary side 56 of the torsional-vibration damper arrangement 16, so that in this case it is possible to dispense with a completely separate cover disk element. The cover disk region 62 of the primary side 56 lies substantially radially inside the stator arrangement 18 of the electric machine 14, which is designed as an external rotor machine. The space taken up is further minimized by the partial axial overlap between the electric machine 14, i.e. in particular its stator arrangement 18, and the torsional-vibration damper arrangement 16. The components which are present simultaneously also serve to radially and/or axially support primary side 56 and secondary side 58 with respect to one another.

Various changes may be made to the drive system 10 according to the invention without having to depart from the fundamental principles of the present invention. For example, the carrier arrangement 34 could comprise only the first carrier element 42, which is then screwed to the crankshaft 12 in its radially inner region, for example that region in which the passage opening 104 is provided in the figure. Furthermore, the concepts primary side and secondary side do not in this case constitute an imperative direction of torque flux; it is also possible for a torque to be introduced via the secondary side and then transmitted to the primary side via the damper element arrangement.

In the drive system according to the invention, it is advantageous, for reasons of cost and production engineering, for the carrier arrangement, in particular the first carrier element 42, and the second cover disk region 64 to be stamped out of sheet-metal material and then given the desired shape by deformation. There is then no need for any metal-removing machining operations.

Figure 2:
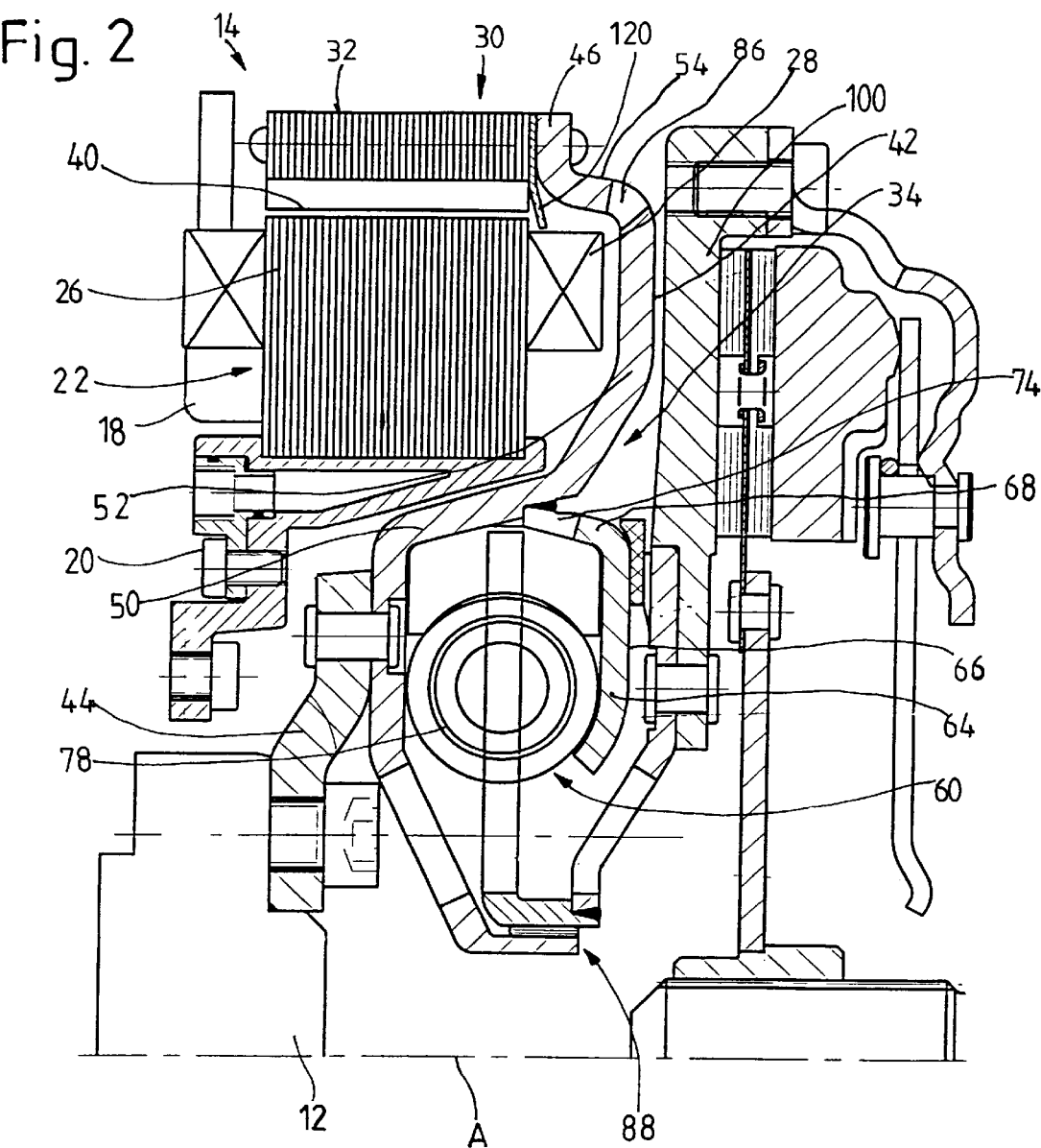
FIG. 2 shows a view, corresponding to that shown in FIG. 1, of a modified embodiment.

A modification of the embodiment shown in FIG. 1 is illustrated in FIG. 2. Therefore, the following text only deals with the differences in design. It can be seen that in this case the particle-removal openings 74 are no longer provided in the first carrier element 42, i.e. in the connecting section 50 thereof, but rather are now provided in the connecting section 68 of the second cover disk region 64, namely in its axial end region. Therefore, in the axial direction these particle-removal openings 74 are ultimately closed off by the connecting section 50 of the second carrier element 42. The significant advantage of this is that particles which have been discharged through these particle-removal openings 74 cannot reach the region of the air gap 40, but rather escape between the carrier element 42 and the flywheel 100.

A sealing element, for example metal sealing sheet 120, is provided radially on the outside between the rotor interaction region 32 and the section 46 of the carrier element 42. This sealing element projects radially inward beyond the radial region of the air gap 40 and ends close to the end windings 28. This too ultimately makes a contribution to preventing particles from entering the region of the air gap 40. The carrier element 42 may have radially outer particle-removal openings 86 or may be designed in the manner illustrated in FIG. 1. In this radially outer region, the carrier elements 42, including section 46, may be designed as a web, i.e. with arm sections which extend substantially radially outward, in order to enable contaminating particles or the like to be discharged radially outward.

In a corresponding way, the second carrier element 44 may be formed with an annular body region which lies radially on the inside and is provided with individual arm or web sections on the radially outer side. It is then possible for air to enter between these arm or web sections and then to leave again through the above-described fan or air-opening arrangement in the region of the section 52. It is thus possible to provide a flow of air which flows around the stator arrangement and becomes important in particular if liquid or fluid cooling of the stator arrangement 18 is not employed.

Figure 7:
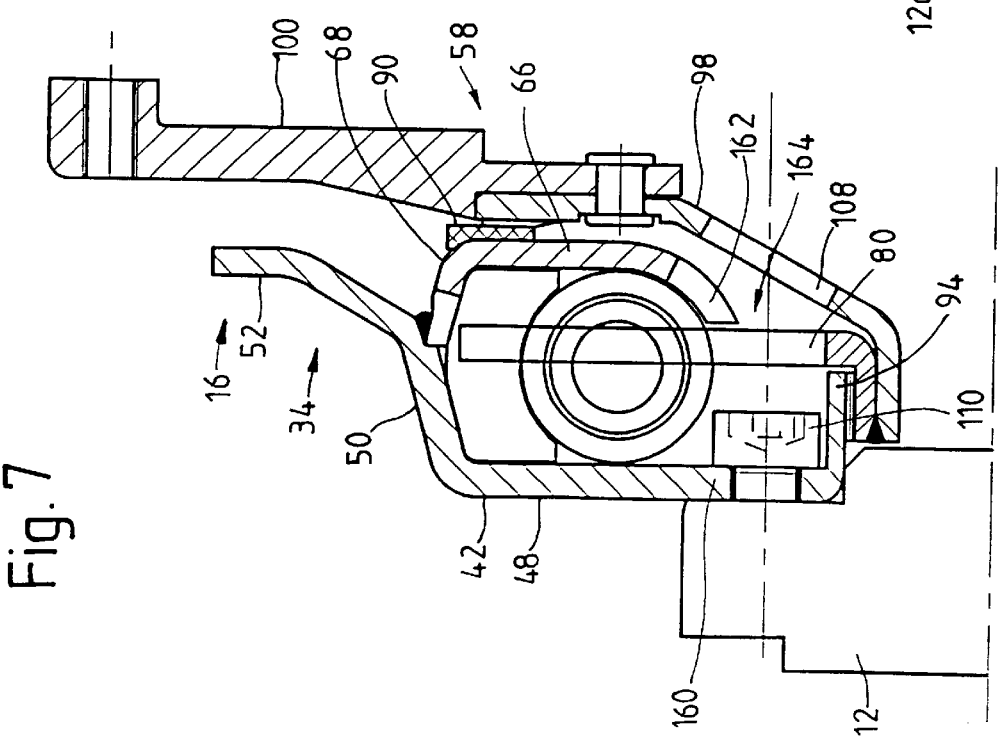

Further modifications of the design principle of the torsional-vibration damper arrangement 16 illustrated in FIGS. 1 and 2 are illustrated in FIGS. 5–7. These modifications are described below on the basis of the design differences.

FIG. 5 shows an embodiment which is substantially based on the embodiment shown in FIG. 2. However, the first carrier element 42 does not project radially inward as far as is shown in FIG. 2. Rather, the radially inner, substantially cylindrical section 94 of the first carrier element 42 lies radially outside that region in which the threaded bolts 110 for coupling the torsional-vibration damper arrangement 16 to the crankshaft 12 lie. It is therefore not necessary to provide openings for the threaded bolts 110 to pass through the torsional-vibration damper arrangement 16. Furthermore, a very compact design of the torsional-vibration damper arrangement 16 is obtained in this way.

In the design principle shown in FIG. 6, the size has been reduced toward the radially inner side, as a result of a bearing region 150 provided on the carrier arrangement 34 or the carrier element 42 thereof, in a transition region between the sections 50 and 52. The secondary side 58 of the torsional-vibration damper arrangement 16 is supported both axially and radially on the bearing 150, namely toward the radially outer side, with respect to the primary side 56, with a bearing section designed, for example, as a sliding bearing ring 152 mounted in between. Therefore, the sections which lie radially inside the damper element arrangement 60 and serve to bear or support primary side 56 with respect to secondary side 58 are eliminated. It can be seen that the radially inner, substantially cylindrical section 94 of the carrier element 42 now ends significantly to the radially outer side of the threaded bolts 110 and forms a labyrinth-seal-type closure of the space 72 on the radially inner side, by interaction with the central disk element 80. In its radially inner, flange-like region, the disk element 80 is fixedly connected to the coupling element 98, for example by riveting. The threaded bolts 110 alternate in the circumferential direction with individual riveting points. However, it would also be possible for these riveting regions to be positioned radially inside the threaded bolts 110 and for passage openings to be provided in the coupling element 98 or in the central disk element 80. It is also possible for the region of the riveting to be displaced further toward the radially outer side, so that the threaded bolts 110 can be positioned without obstacle from any components of the torsional-vibration damper arrangement 16.

In the embodiment shown in FIG. 7, the carrier arrangement 34 is of substantially single-part design, i.e. it comprises only the carrier element 42. In its radially outer region (not shown in FIG. 7), this element carries the rotor interaction region, while in its radially inner region 160 it is screwed onto the crankshaft 12 by the threaded bolts 110. In between, by means of its sections 48, 50, the carrier element 42 again forms the part of the primary side 56. In its radially inner region, the cover disk element 66 is axially curved and by means of its end region 162 extends, in the direction of the axis, virtually all the way to the central disk element 80. On the other axial side of the central disk element 80, the carrier element 42 extends axially, by means of its substantially cylindrical, radially inner end section 94, likewise virtually as far as the central disk element 80. These two sections 94 and 162 ultimately provide an axial securing arrangement 164 which, prior to incorporation in, for example, a drive train, ensures defined axial holding between primary side 56 and secondary side 58 of the torsional-vibration damper arrangement 16. It can also be seen in FIG. 7 that the central disk element 80 is fixed, for example by welding, to the coupling element 98 in a region which lies radially inside the radial support with respect to the carrier element 42. To this end, the coupling element 98 and the central disk element 80 have cylindrical sections which engage one another.

Figure 3:
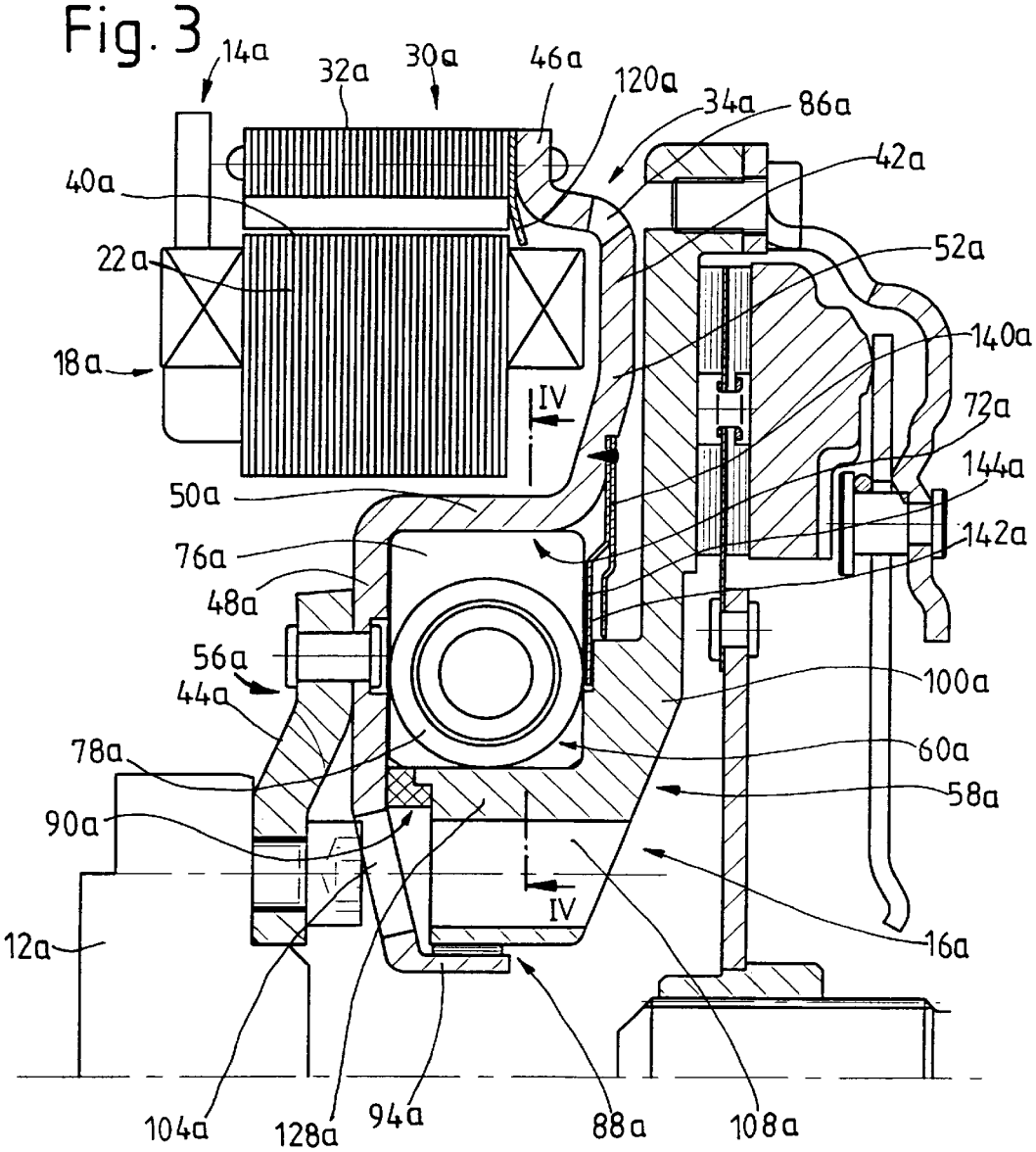
FIG. 3 shows a further view corresponding to that shown in FIG. 1 of a modified embodiment.
Figure 4:
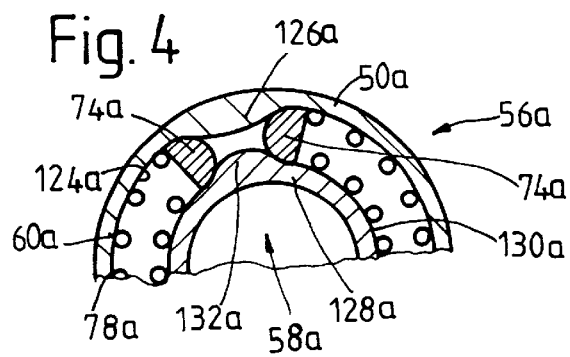
FIG. 4 shows a diagrammatic partial cross-sectional view on line IV–IV in FIG. 3.

A further modification to the drive system according to the invention is illustrated in FIGS. 3 and 4. Components which correspond to components which have been described above in terms of structure and/or function are provided with the same reference numeral with the addition of the suffix "a". The following text substantially deals with the design differences.

In the embodiment shown in FIGS. 3 and 4, the carrier element 42a, by means of its sections 48a, 50a, once again substantially forms the primary side 56a of the torsional-vibration damper arrangement 16a. The connecting section 50a, which connects the sections 48a and 52a, is of substantially cylindrical design and once again axially overlaps the stator arrangement 18a. However, in the connecting section 50a, which extends substantially axially, i.e. cylindrically, the carrier element 42a is not designed with a rotationally symmetrical internal circumferential surface 124a. It can be seen in FIG. 4 that at a plurality of circumferential regions, a plurality of driver sections 126a are provided on the internal circumferential surface 124a, which driver regions are designed as bulges which project radially inward. In a corresponding way, the secondary side 58a, in a cylindrical section 128a, has a plurality of bulges 132a on the outer circumferential surface 130a thereof. These bulges 126a, 132a ultimately form the driver or force-coupling regions of the primary side 56a and the secondary side 58a, respectively, by means of which the damper element arrangement 60a, i.e. the damper springs 78a, are now acted on via the spring plates 74a. In the event of relative rotation in the circumferential direction between primary side 56a and secondary side 58a, some of the spring plates or spring saddles 74a are driven in the circumferential direction by the bulges 126a on the primary side 56a, and the remainder of the spring plates or spring saddles are driven in the circumferential direction by the bulges 132a on the secondary side 58a, and in the process the springs 78a are compressed. As a result of the bulges 126a and 132a, which are of wedge-like design, a radial force is generated at the same time, by means of which force the spring plates 74a are pressed against the respectively other side of primary side 56a and secondary side 58a, so that in addition a frictional damping force is generated.

The illustration given in FIG. 4 is only diagrammatic. Naturally, these bulges 126a, 132a may have various other configurations; by way of example, the surface 130a could also be of polygonal design. However, in this embodiment too it is important that the primary side 56a, i.e. in particular the force-coupling region thereof, is formed by the rotor carrier arrangement 34a or the carrier element 42a thereof or comprises a substantial part thereof.

To obtain a closed space 72a, two metal sealing sheets 140a, 142a are provided. Together with the sealing sheet 140a, the sealing sheet 142a forms a collection chamber 144a which, in its radially outer region, is open to the space 72a through one or more openings. Therefore, fluid which has entered this collection space 144a can be discharged again to the radially outer side and can enter the space 72a. On the radially outer side, the two metal sealing sheets 140a, 142a are fixed to the carrier element 42a, for example by welding.

In this embodiment, the secondary side 58a substantially comprises the flywheel 100a which, by means of its radially inner cylindrical section 148a, substantially forms the section for interaction with the damper element arrangement 60a.

Otherwise, the embodiment illustrated in FIG. 3 substantially also corresponds to the embodiments which have already been described above, so that in this respect reference may be made to the statements given above. In particular, the secondary side 58a is supported radially and axially with respect to the primary side 56a by two bearing arrangements 88a, 90a, the axial bearing arrangement 90a now being axially supported on the section 48a of the carrier element 42a which lies radially inside the damping springs 78a. The cylindrical section 128a of the flywheel 100a, which forms the bulges 132a on its inner circumferential surface 130a, is supported, by means of its outer circumferential surface and via the bearing arrangement 88a, on the cylindrical section 94a of the carrier element 42a.

Figure 8:
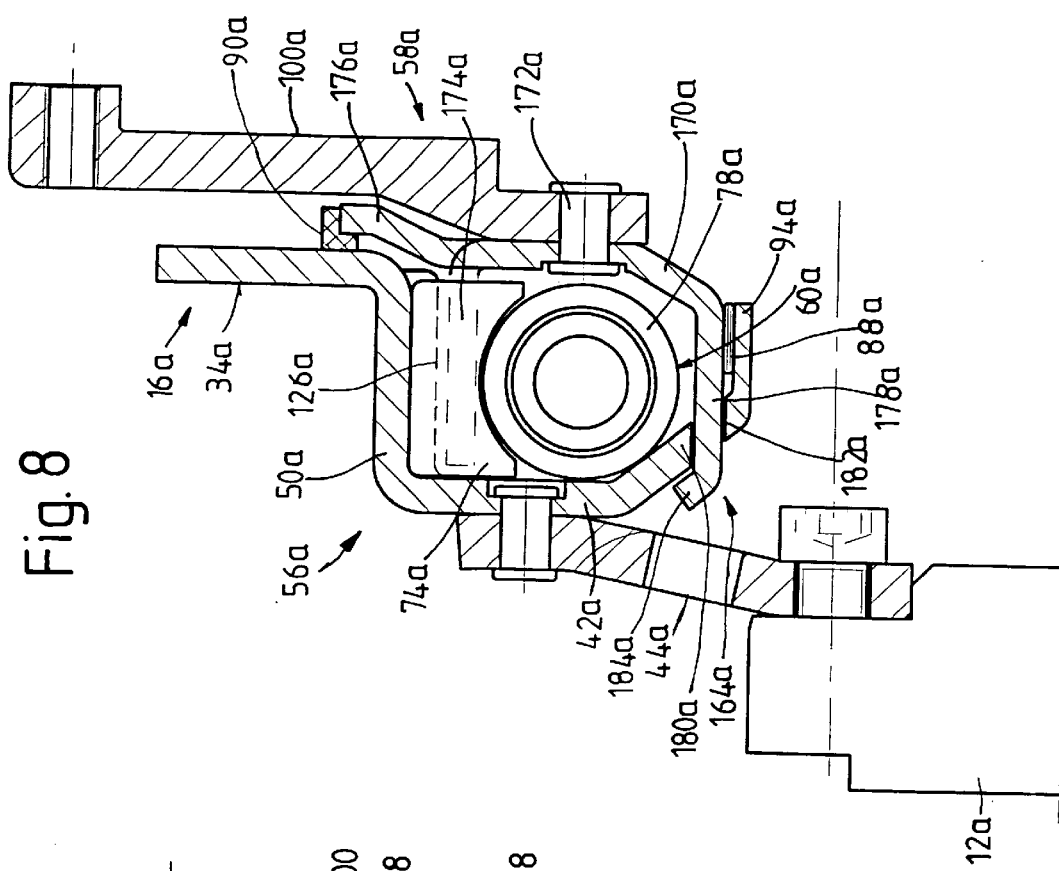

Further embodiments of the torsional-vibration damper arrangement which follow the principle illustrated in FIGS. 3 and 4 are illustrated in FIGS. 8–12. In FIG. 8, the carrier element 42a of the primary side 56a of the torsional-vibration damper arrangement 16a includes a section 50a having bulges 126a, or corresponding deformed regions, which once again project radially inward. These bulges 126a form first force-transmission sections associated with the primary side 56a. The secondary side 58a now has a driver element 170a which is coupled to the flywheel mass 100a, for example by rivets 172a or the like, and may be a component which is stamped from sheet metal and formed. This driver element 170a includes a second force-transmitting section 174a which is associated with each of the first force-transmitting sections or bulges 126a of the primary side 56a, and which extends substantially axially and is formed, for example, by bending a tab section. This second force-transmitting section lies radially inside the respectively associated bulge 126a and between two spring plates 74a in the circumferential direction. Therefore, as in the embodiment shown in FIGS. 3 and 4, the first and second force-transmitting sections 126a, 174a, each lie between the ends of two damper springs 78a which directly follow one another in the circumferential direction. Naturally, it would also be possible in this case to provide interlinked springs, as can be seen from FIG. 8.

Between the individual second force-transmitting regions 174a lie bearing section 176a which extend in the radially outward direction and are axially supported on the first carrier element 42a by a sliding bearing element 90a between them. Radially inside the damper element arrangement 60a, an approximately cylindrical or axially extending section 178a of the driver element 170a extends toward a radially inwardly extending section 180a of the carrier element 42a. The section 178a in this case has a plurality of arms or tab-like sections which pass through corresponding openings 182a in the section 180a of the carrier element 42a and are bent over in their free end regions 184a. This provides an axial securing arrangement 164a for the primary side 56a and the secondary side 58a, since they can no longer move away from one another in the axial direction. Furthermore, a rotational angle limitation, which only allows a limited rotation angle between primary side 56a and secondary side 58a and therefore prevents overloading the damper element arrangement 60a, is provided by a corresponding circumferential width of the arms, which form the section 178a, and the openings 182a.

In the embodiment of FIG. 8, the driver element 170a, with its axially bent regions 174a and 178a, formed so that the overall space taken up is minimized, i.e. the radial space regions which lie between these regions 174a, 178a and the damper springs 78a should be as small as possible.

Furthermore, the bearing arrangement 88a which serves to radially support the primary side 56a with respect to the secondary side 58a once again lies between the sections 178a and 94a.

FIG. 9 shows a design variant in which the driver element 170a is radially and axially supported toward the radially outer side by means of its sections or arms 176a, and bearing element 152a provided on the carrier element 34a, i.e. on its carrier element 42a. The driver element 170a ends substantially radially inside its connection to the flywheel 100a. A prestressing element 188a, which is designed, for example, as a disk spring, is supported on the radially inner end region 188a of the driver element 170a by means of its radially outer region. By means of its radially inner end region, this spring element 180a engages in a circumferential groove 190a in the axial end region 192a of the section 94a of the carrier element 42a. Therefore, a prestress is provided, which ensures that the primary side 56a and the secondary side 58a are held together in a defined way. In particular, the driver element 170a is prestressed so that it is in defined contact with the bearing element 152a. Therefore, the prestressing element 188a substantially in turn forms the axial securing arrangement 164a. To allow the prestressing element 188a to be inserted into the groove 190a, the section 94a of the carrier element 42a is of radially elastic design, which can be achieved, for example, by providing an approximately axially extending slot in at least one circumferential region of this section 94a. In principle, it is also possible for the prestressing element 188a to be designed with a plurality of spring tongues or the like, which can then be deformed during assembly.

In the embodiment shown in FIG. 10, a bearing arrangement 194a is provided on the carrier element 42a, in its section 50a for radial and partial axial support of the damper elements 78a. This bearing arrangement 194a comprises at least one sliding bearing element 196a which may be formed from plastic material and, with a shell-like contour, is fixed to a correspondingly curved contour of the section 50a, for example by adhesive bonding. In this way, it is possible for the damper springs 78a to be supported on the radially outer side on the primary side 56a with very little friction and therefore also very little wear. The curved contour of the section 50a and the at least one sliding bearing element 196a also ensures axial centering of the damper springs 78a.

A securing ring, for example circlip 200a, is inserted into a groove 190a in the section 94a of the carrier element 42a, which ring holds the driver element 170a in a defined axial position with respect to the carrier element 42a and therefore also holds the arm sections 176a of the driver element 170a in defined contact with the axial bearing arrangement 90a. This ensures a defined axial relative positioning between the primary side 56a and the secondary side 58a when a torsional-vibration damper arrangement 16a of this type is incorporated into a drive system.

In the variant embodiment illustrated in FIG. 11, the bearing arrangement 194a for the damper elements 78a of the damper element arrangement 60a has a coating 202a of sliding-bearing material on the inner side of the section 50a of the carrier element 42a. This may be applied by vapor deposition or electrolytically or in some other way. This coating once again ensures that, when centrifugal forces are active, the damper elements 78a can move along the section 50a substantially with little wear and friction.

In the embodiment shown in FIG. 12, the bearing arrangement 194a includes a rolling bearing 204a having two bearing shell elements 206a, 208a. The bearing shell element 206a is supported on the radially outer side on the section 50a, and the bearing shell element 208a is supported on the radially inner side on the damper springs 78a of the damper element arrangement 60a and serves to radially support these damper springs 78a. Between the bearing shell elements 206a, 208a there lie a plurality of rolling bodies, for example balls 210a, which follow one another in the circumferential direction and are held together by a roller cage 212a which may be made of plastic. The section 50a and also the radially outer bearing shell element 206a once again have a contour which is curved in the direction of the axis, which firstly ensures that the bearing shell element 206a is centered with respect to the section 50a, and secondly ensures that the rollers 210a remain in a defined axial position. The axial configuration of the radially inner bearing shell element 208a is once again adapted to the circumferential contour of the damper springs 78a.

In the embodiments described above, it is possible for various groups of functions also to be transferred to other embodiments. For example, it is possible to provide axial securing in the embodiment shown in FIG. 12, for example by providing a securing ring. In the embodiments shown in FIGS. 10–12 a single bearing region could be provided, on which the primary side and secondary side are supported with respect to one another both in the axial direction and in the radial direction. In the embodiments shown in FIGS. 3, 4 and 8–11, it is also possible for bulges or force-transmitting sections for driving the associated spring plates to be provided in radially extending regions of the carrier element 42a. It can be seen that, in particular in the embodiments shown in FIGS. 3, 4 and 8–12, it is not necessary to provide an additional damper element, which contributes to a relatively simple structure with a smaller number of parts.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A drive system comprising
   an electric machine for one of driving a shaft to rotate and obtaining rotational energy from a rotating shaft, said electric machine comprising a stator arrangement having a stator interaction region and a rotor arrangement having a rotor interaction region,
   a carrier arrangement for coupling said rotor interaction region to said shaft, the carrier arrangement having a region which is located substantially radially inside the stator arrangement and which axially overlaps the stator region, and
   a torsional vibration damper arrangement comprising a primary side which is formed at least in part by said carrier arrangement, a damper element arrangement, and a secondary side which can rotate relative to the primary side about an axis of rotation counter to the action of the damper element arrangement.

2. The drive system as claimed in claim 1, wherein the carrier arrangement comprises a part which supports forces of the damper element arrangement.

3. The drive system as claimed in claim 1, wherein the primary side comprises two force-supporting regions which, at least in part, lie at an axial distance from one another, and wherein the carrier arrangement forms one of the force-supporting regions.

4. The drive system as claimed in claim 3, wherein the primary side comprises two cover disk regions which form the force-supporting regions, and wherein the carrier arrangement forms one of the cover disk regions, said cover disk regions being connected.

5. The drive system as claimed in claim 4, wherein the carrier arrangement comprises a connecting section for connecting said one of the cover disk regions to the other cover disk region, which connecting section extends axially and radially outward toward the other cover disk region.

6. The drive system as claimed in claim 5, wherein the connecting section lies substantially radially inside the stator arrangement.

7. The drive system as claimed in claim 5, wherein the other cover disk region comprises a connecting section which extends axially toward the carrier arrangement.

8. The drive system as claimed in claim 4, wherein the secondary side is axially supported on the carrier arrangement via the second cover disk region.

9. The drive system as claimed in claim 8, wherein the secondary cover disk region comprises a section which extends substantially radially, a connecting section which extends axially and radially outward toward the carrier arrangement, and a transition therebetween, said secondary side being supported at said transition.

10. The drive system as claimed in claim 8, wherein the secondary side is supported on the second cover disk element by a slide bearing arrangement therebetween.

11. The drive system as claimed in claim 4, wherein the two cover disk regions define a space therebetween which contains the damper element arrangement and is at a maximum radial distance from the axis of rotation proximate to the connection between the two cover disk regions.

12. The drive system as claimed in claim 11, further comprising at least one particle-removal opening in at least one of the cover disk regions, which particle-removal opening opens into the space where said space is at the greatest radial distance from the axis of rotation.

13. The drive system as claimed in claim 4, wherein the secondary side is axially and/or radially supported on the carrier arrangement, radially outside the connection of the second cover disk region to the carrier arrangement.

14. The drive system as claimed in claim 3, wherein the secondary side has a central disk element which engages axially between the two force-supporting regions of the primary side.

15. The drive system as claimed in claim 14, wherein the central disk element is supported on the carrier arrangement by a radial bearing arrangement.

16. The drive system as claimed in one of claim 1, wherein the carrier arrangement has at least one first force-supporting region for the damper element arrangement in a region which extends substantially axially and radially outside the damper element arrangement, wherein the primary side has a first force supporting region, and wherein the secondary side has a second force-supporting region, which extends substantially axially, associated with said first force-supporting region.

17. The drive system as claimed in claim 16, wherein the first force-supporting region and the associated second force-supporting region, in the circumferential direction, lie between end regions of two damper elements which follow one another in the circumferential direction.

18. The drive system as claimed in claim 16, wherein the carrier arrangement has a carrier element which forms the part of the primary side wherein the secondary side has a driver element which has the at least one force-supporting region, and wherein the carrier element and the driver element together form a rotation-angle limitation for the torsional-vibration damper arrangement.

19. The drive system as claimed in claim 1, wherein the secondary side is supported on the carrier arrangement in at least one of a radial direction and an axial direction.

20. The drive system as claimed in claim 19, comprising a bearing region on the carrier arrangement for axially and radially supporting the secondary side with respect to the primary side.

21. The drive system as claimed in claim 1, wherein the carrier arrangement comprises a first carrier element, which forms at least a part of the torsional-vibration damper arrangement and carries the rotor interaction region, and a second carrier element, which couples the first carrier element to the shaft.

22. The drive system as claimed in claim 21, wherein the second carrier element comprises a contact region which is in contact with the first carrier element, which contact region is convex with respect to the first carrier element and extends around the axis of rotation.

23. The drive system as claimed in claim 21, wherein the secondary side is supported radially with respect to the primary side, on a radially inner region of the primary side, and wherein the second carrier element can be coupled to the shaft radially inside the radial support of the secondary side with respect to the primary side.

24. The drive system as claimed in claim 1, wherein the carrier arrangement has a carrier element having a radially outer region, which carries the rotor interaction region, and a radially inner region which can be coupled to the shaft, and between said radially outer region and its radially inner region forms part of the primary side.

25. The drive system as claimed in claim 1, wherein the carrier arrangement has at least one air-passage opening which is axially adjacent to the stator arrangement.

26. The drive system as claimed in claim 1, wherein the carrier arrangement has a hollow-like particle-receiving region which faces radially inward and surrounds the axis of rotation at least one particle-removal opening passing radially through the particle-receiving region.

27. The drive system as claimed in claim 1, wherein at least some of the damper elements of the damper element arrangement are radially and axially supported on the primary side by a bearing arrangement.

28. The drive system as claimed in claim 27, wherein the bearing arrangement comprises at least one sliding bearing element which is carried on the primary side.

29. The drive system as claimed in claim 27, wherein the bearing arrangement comprises a coating of sliding bearing material which is provided on the primary side.

30. The drive system as claimed in claim 27, wherein the bearing arrangement comprises a rolling bearing arrangement which is supported with respect to the primary side and the damper element arrangement.

31. The drive system as claimed in claim 1, comprising an axial securing arrangement which acts between the primary side and the secondary side.

32. The drive system as claimed in claim 1, wherein the primary side comprises two cover disk regions which define a space in which the damper element arrangement is arranged, and wherein at least one particle-removal opening, which opens out into a radially outer region of the space, is provided in at least one of the cover disk regions.

33. A drive system as in claim 1 wherein said rotor arrangement is fixed to said carrier arrangement.

34. A drive system as in claim 1 further comprising a shaft, said electric machine either driving said shaft to rotate or obtaining rotational energy from said shaft, said carrier arrangement being fixed to said shaft.

35. A drive system as in claim 1 wherein rotation of said secondary side relative to said primary side is limited.

36. A drive system as in claim 1 further comprising a flywheel which is fixed with respect to said secondary side.

\* \* \* \* \*